(12) United States Patent
Niitsu et al.

(10) Patent No.: US 7,639,348 B2
(45) Date of Patent: Dec. 29, 2009

(54) STRESS MEASURING METHOD AND INSTRUMENT

(75) Inventors: Yasushi Niitsu, Tokyo (JP); Kensuke Ichinose, Tokyo (JP); Kenji Gomi, Tokyo (JP)

(73) Assignee: Tokyo Denki University, Tokyo (JP)

( * ) Notice: Subject to any disclaimer, the term of this patent is extended or adjusted under 35 U.S.C. 154(b) by 370 days.

(21) Appl. No.: 10/586,148

(22) PCT Filed: Mar. 5, 2004

(86) PCT No.: PCT/JP2004/002918

§ 371 (c)(1),
(2), (4) Date: Apr. 5, 2007

(87) PCT Pub. No.: WO2005/068957

PCT Pub. Date: Jul. 28, 2005

(65) Prior Publication Data

US 2007/0273865 A1    Nov. 29, 2007

(30) Foreign Application Priority Data

Jan. 15, 2004    (JP) .......................... 2004-007599

(51) Int. Cl.
*G01B 11/16* (2006.01)
*G01J 4/00* (2006.01)

(52) U.S. Cl. .......................... 356/33; 356/368; 356/364
(58) Field of Classification Search ......... 356/364–368, 356/32–34
See application file for complete search history.

(56) References Cited

U.S. PATENT DOCUMENTS 4,850,710 A    7/1989    Mochida et al.
5,400,131 A *  3/1995    Stockley et al. ............... 356/33
5,627,645 A *  5/1997    Imagawa et al. ............. 356/364
6,927,853 B2 * 8/2005    Geiler et al. ................. 356/367
6,985,227 B2 * 1/2006    Wang ........................ 356/364
7,301,633 B2 * 11/2007   Gibbs et al. ................. 356/369
7,369,234 B2 * 5/2008    Beaglehole ................. 356/369

FOREIGN PATENT DOCUMENTS

JP    4-70582 B2    11/1992

(Continued)

OTHER PUBLICATIONS

S.R. Lederhandler, "Infrared Studies of Birefringence in Silicon," *Journal of Applied Physics*, vol. 30, No. 11, Nov. 1959, pp. 1631-1638.

(Continued)

*Primary Examiner*—L. G Lauchman
(74) *Attorney, Agent, or Firm*—Workman Nydegger

(57) ABSTRACT

The stress of a sample semiconductor wafer is detected with high accuracy in the form of an absolute value without rotating the sample or the entire optical system. A laser light R is subjected to photoelastic modulation in a PEM 6 to generate a birefringence phase difference and then it is passed through first and second quarter wavelength plates and passes through a semiconductor wafer D having residual stress. When it is passed through a test piece, the direction of the stress of the test piece is detected when the angle between the laser light R and a linear polarization light is 0 and 90 degrees. The transmitted electric signal is delivered to an analog/digital converter 16, and the signal is inputted to a signal processor thus generating transmission signal data. The signal processor reads out the stored reference signal data and the transmission signal data and calculates a reference birefringence phase difference and the absolute values of the birefringence phase difference.

4 Claims, 5 Drawing Sheets

FOREIGN PATENT DOCUMENTS

| | | |
|---|---|---|
| JP | 2713190 B2 | 10/1997 |
| JP | 10-153500 A | 6/1998 |

OTHER PUBLICATIONS

Kazuhiro Date, "Stress Measurement with High Sensitivity in Wafer Using Infrared Photoelasticity," *Advances in Electronic Packaging*, vol. 2, 1992, pp. 985-989.

R.O. DeNicola et al., "Effect of Growth Parameters on the Residual Stress and Dislocation Density of Czochralski-Grown Silicon Crystals," *Journal of Applied Physics*, vol. 42, No. 11, Oct. 1971, pp. 4262-4270.

P. Dobrilla et al., "Optical Mapping of Residual Stress in Czochralski Grown GaAs," *Applied Physics Letters*, vol. 48, No. 19, May 12, 1986, pp. 1303-1305.

G. Qin et al., "Measurement of Stresses in Silicon Wafer with Infrared Photoelastic Method," *Chin. J. Infrared and Millimeter Waves*, vol. 7, No. 2, 1987, pp. 139-144.

M. Yamada et al., "Quantitative Photoelastic Characterization of Residual Strain and its Correlation with Dislocation Density Profile in Semi-insulating LEC-grown GaAs Wafers," *Proc. 7th Conf. on Semi-insulating III-V Materials*, Ixtapa, Mexico, 1992, pp. 201-210.

R.D. Clayton et al., "Scanning Birefringence Mapping of Semi-insulating GaAs Wafers," *Proc. 7th Conf. on Semi-insulating III-V Materials*, Ixtapa, Mexico, 1992, pp. 211-216.

Masayoshi Yamada, "High-sensitivity Computer-controlled Infrared Polariscope" *Review of Scientific Instruments*, vol. 64, No. 7, Jul. 1993, pp. 1815-1821.

Hancheng Liang et al., "A New Method of Determining the Stress State in Microelectronic Materials," *Measurement Science and Technology*, vol. 7, 1996, pp. 102-105.

Kenji Gomi et al., "The Influence of Crystalline Orientation on the Photoelastic Property of {100} Gallium Arsenide Wafer," *JSME International Journal*, Series A, vol. 41, No. 2, 1998, pp. 274-279.

Kenji Gomi et al., "Residual Stress Evaluation of GaAs Wafer by Infrared Laser Photoelasticity," No. 98-1332, pp. 2143-2148, Oct. 1999.

Kenji Gomi et al., "Influence of Crystalline Orientation on Photoelastic Property of Si Single Crystal," No. 96-0641, pp. 2651-2656, v. 1.41, No. 2, 1998.

* cited by examiner

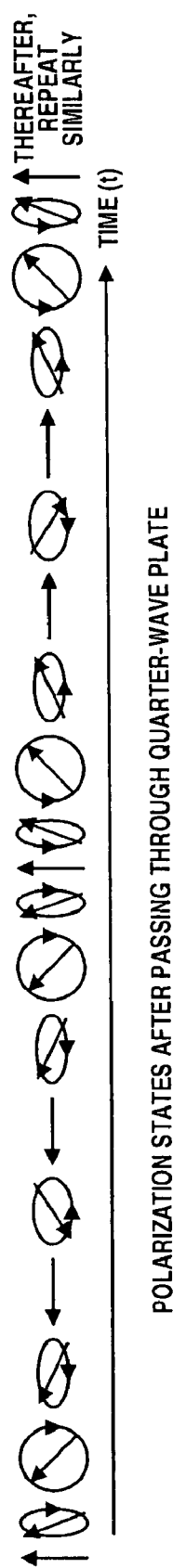

STRESS MEASURING METHOD AND INSTRUMENT

TECHNICAL FIELD

The present invention relates to a method and apparatus for measuring stress, and more particularly to a method and apparatus for measuring birefringence phase difference based on laser photoelasticity technology. The present invention also relates to a quantitative measurement method of material property in the semiconductor industry such as crystal production; process induction stress measurement devices for semiconductor wafers; stress measurement devices used during the operation of semiconductor laser devices; evaluators for evaluating the perfection of respective single crystals; and detectors for detecting substances separated by high performance liquid chromatography (HPLC).

BACKGROUND ART

Recently, in many product categories, the use of system LSI having more densely packed and more highly integrated multifunctional ICs, i.e. nanotechnology ultra-VLSI devices (hereinafter simply referred to as "new semiconductor devices") has increased. Thus, the application range thereof is diverse, from digital appliance daily necessities such as portable phones to space gadgets. Thus, to sustain modern society, new semiconductor devices are indispensable components.

On the other hand, one of the causes of restricting performance of recent highly-packed and highly-integrated electronic devices that feature ultra-low power consumption, ultra-high speed operation and ultra-compact size is a problem associated with the material's strength, i.e., delamination of circuit pattern breakage of a circuit disconnection package, a subtle deformation of the semiconductor wafer, or the like, which occurs when manufactured or used. Accordingly, it is desired to establish an evaluation technique to overcome such problems associated with the material's strength that occur when manufacturing or using a device.

At the same time, there has been a serious need for more efficient production of new semiconductor devices, i.e., higher yields. A factor that prevents the need from being satisfied is the quality of single crystal wafers which is the material of the new semiconductor devices. The quality of the single crystal wafer is evaluated by the perfection of the arrangement of atoms which constitutes the wafer. A current severe problem which causes disarray of the arrangement is the residual stress of the wafer.

A process for producing device chips from a wafer often uses elevated temperatures of about 700° C. to about 1000° C. At this time, because of the high temperature, the critical resolved shear stress (σ CRSS) significantly drops. Then, if the superimposition of the thermal and residual stresses exceeds σ CRSS, the single crystal would induce crystal gliding or translation gliding. Therefore, it is found that suppressing the residual stress of a wafer as low as possible is necessary.

In a typical process of producing semiconductor wafers, particularly silicon (herein after referred to as "Si") wafers often obtain a residual stress during the lapping process and the polishing process. Since considerable effort is put into slicing an elongated cylindrical (columnar) ingot into disk-shaped wafers, the polishing amount when polishing a sliced surface is controlled as to be as small as possible. Conversely, it is known that an insufficient polishing amount causes the occurrence of and an increase in the residual stress.

Semiconductor wafers are produced and processed in a clean room. Thus, it is desirable that the residual stress is measured in a non-contact manner. Therefore, photoelastic measurement techniques have been conventionally used for measuring the residual stress of semiconductor wafers.

At the earliest stage of the history of photoelastic measurement, the residual stress upon a sample was measured using the interference pattern produced when light is impinged upon (transmitted through) a semiconductor wafer sample which was sliced as thick as 10 mm. In this case, however, the sample wafer was so thick that the sample wafer could only be used for measuring the residual stress and could not be returned to the production line. Thus, the sample wafer was wasted. For this reason, a 100-percent inspection was impossible.

Conventional photoelastic measurement methods using laser beams are roughly classified into two groups: methods using a photoelastic fringe pattern (fringe analyses); and methods not using a photoelastic fringe pattern (sub-fringe analyses).

The fringe analysis is suitable for roughly grasping an overview of stress distributed over a sample, wherein the stress distribution of the sample is obtained in an experimental analysis fashion from two fringe patterns: an isoclinic fringe pattern given by a linear polariscope (principal stress direction distribution chart); an isochromatic fringe pattern given by a circular polariscope (principal stress difference distribution chart). Generally, this method is not suitable for measuring stress distributed over a very small area or measuring subtle stress.

One technique for measuring stress distribution of a semiconductor ingot or a semiconductor wafer with this fringe analysis is as follows.

Lederhandler measured according to the fringe analysis of residual stress distribution of an Si ingot which had been grown by the Czochralski technique (CZ technique, one of the crystal pulling methods) and pointed out that the temperature gradient during crystal growth exceeds the yield stress of Si.

S. R. Lederhandler, "Infrared Studies of Birefringence in Silicon," J. Appl. Phys., 30-11 (1959), 16311638.

Other techniques for measuring the stress distribution of a semiconductor ingot or a semiconductor wafer with this fringe analysis method are listed below.

K. Date, "Stress Measurement with High Sensitivity in Wafers Using Infrared Photoelasticity," Proc. of Advanced in Elec. Pack., Vol. 2 (1992), 985-989.

R. O. Denicola and R. N. Tauber, "Effect of Growth Parameters on the Residual Stress and Dislocation Density of Czochralski-Grown Silicon Crystal," J. Appl. Phys., 42-11 (1971), 4262-4270.

P. Dobrilla and J. S. Blakemore, "Optical mapping of residual stress in Czochralski grown GaAs," Appl. Phys. Lett., 48(19) (1986), 1303-1305.

G. Qin, H. Liang, S. Zhao and H. Yin, "Measurement of Stresses in Silicon Wafers with the Infrared Photoelastic Method," Chin. J. Infrared and Millimeter Waves, 7(2) (1987), 139-144.

M. Yamada, M. Fukuzawa, N. Kimura, K. Kaminaka and M. Yokogawa, "Quantitative photoelastic characterization of residual strain and its correlation with dislocation density profile in semi-insulating LEC-grown GaAs wafers," Proc. 7th Conf. on Semi-insulating III-V Materials, Ixtapa, Mexico, (1992), 201210.

On the other hand, the method not using a photoelastic fringe pattern is effective when a photoelastic fringe pattern is not observed and this method is suitable for measuring stress distributed over a very small area or measuring subtle stress. This method is used in the case when a fringe cannot be observed since the stress is subtle or when the precise stress between fringes is measured.

Specifically, a birefringence amount is determined from the difference between laser polarization before incident upon a sample and laser polarization after being transmitted through the sample, and then converted into stress. Thus, the mean stress within a laser spot area is measured. Accordingly, in order to measure stress distributed over a very small area, a point-by-point measurement should be carried out by the use of a laser having a small laser spot diameter.

For example, when it is desired to obtain an overview of the stress distribution of one semiconductor wafer, it is necessary to deliver the wafer by an X-Y stage, measure stress states at a plurality of points, and obtain the overview there from.

Techniques for measuring subtle-stress distribution are as follows. Clayton et al. developed a scanning birefringence mapping system, which requires rotation of a sample during measurement of its stress, for measuring the residual stress of the LEC-grown GaAs wafer.

R. D. Clayton, I. C. Bassignana, D. A. Macquistan and C. J. Miner, "Scanning birefringence mapping of semi-insulating GaAs wafers," Semi-insulating III-V Materials, Ixtapa, Mexico, (1992), 211216

Yamada developed a computer-controlled infrared polariscope, which requires rotation of two optical elements (a polarizer 5 and an analyzer 10) during measurement of stress, for measuring the residual stress of the LEC-grown GaAs wafer (see, for example, non-patent reference 8).

M. Yamada, "High-sensitivity computer-controlled infrared polariscope," Rev. Sci. Instrum., 647 (1993), 1815-1821.

Liang et al. developed a linear polariscope which requires always rotating an analyzer 10 and also making reference to the possibility of measuring the residual stress of an Si wafer (see, for example, non-patent reference 9).

H. Liang, S. Zhao and K. Chin, "A new method of determining the stress state in microelectronic materials," Meas. Sci Technol., 7 (1996), 102-105.

Especially, the aforementioned Liang et al. experimentally clarified the residual stress of the Si wafer by the use of photoelastic measurement technology. Liang et al. quantitatively researched the residual stresses induced during the polishing process and the like, and reported that the stress of some MPa remains in terms of the principal stress difference.

Currently, in Japan and Germany, SIRDs are available from TePla AG Jena Office (the Japan agency: AIMEK) as devices for measuring the residual stress of Si wafers.

For conventional fringe measurement devices, when a subtle stress is measured, the stress measurement becomes difficult in inverse proportion to the thickness of a test piece. Therefore, there have been few cases of success for measuring the residual stress of semiconductor wafers having a thickness of about 600 μm. Generally, the thickness limit for measuring the stress of a plate-like crystal is a few millimeters.

Furthermore, in the devices of Liange and Yamada, the principal axis of the analyzer is a straight line. They are sub-fringe measurement devices of the type that rotates the sample or an analyzer, i.e., optical elements, for detecting the direction of stress.

When the linearly polarized light is passed through a test piece, the direction and magnitude of the stress of the test piece can be explored by the following method, and the direction of the stress of the test piece is detected when the angle between the direction of the stress and the linear polarization light is 0 and 90 degrees. On the other hand, the magnitude of the stress can be first detected when the angle between the direction of the stress and the linear polarization light is 45 degrees. Therefore, it is required to rotate the test piece or the entire optical system a half-turn in order to determine such data.

Conventionally, with the photoelastic techniques, when circularly polarized light (perfect circle only) is transmitted through a test piece, the magnitude of stress of the test piece can be determined immediately, but the direction thereof cannot be known. This is because, for the circularly polarized light, the direction of the stress exerting upon the test piece does not have meaning but only the magnitude thereof has meaning.

Thus, it is considered that further enhancement of the accuracy and speed of the stress measurement is difficult so long as a mechanical movement such as rotation is involved.

These devices suffer from disadvantages that there is no hope for enhancing the measurement speed and accuracy because of rotation, and that they are not suitable for being subjected to inline measurement which requires incorporating such a birefringence phase difference measurement device into the production line.

The SIRD device of the TePla AG Jena Office does not indicate a value of the absolute value of the residual stress (gram number per square millimeters). It detects only a relative value. Accordingly, it is inconvenient for being used for quality control in the production process.

Thus, there is no example of measuring the stress distribution of semiconductor wafers by a sub-fringe measurement device of a type without rotating optical elements.

While there has been a report that a unique photoelastic experimental device was experimentally produced and the stress measurement of semiconductor wafers as thick as 600 μm was successful, such a device was merely an experimental device and could not stably ensure high measuring power.

DISCLOSURE OF INVENTION

In order to solve the problems described above, according to the first invention, there is provided a method of measuring stress using laser photoelasticity, wherein an infrared laser beam from a laser source is impinged upon a polarizer in which the laser beam is converted into a linear polarized light wave that oscillates in a fixed direction on a plane perpendicular to the light path axis; the linear polarized light wave is impinged upon a photoelastic modulator, such that the optical axis matches the light path axis, in which the linear polarized light wave is converted into a modulation polarized wave that changes continuously from linearly polarized light to circularly polarized light with a predetermined frequency; the modulation polarized wave is passed through a first quarter-wave plate and a second quarter-wave plate in this order and impinged upon an analyzer in which the modulation polarized wave is converted into a linear modulation polarized wave that oscillates in another direction; the linear modulation polarized wave is impinged upon a photodetector in which an electric signal corresponding to the physical property of the linear modulation polarized wave is generated; then, a test sample is disposed between the first quarter-wave plate and the second quarter-wave plate; the modulation polarized wave is passed there through; and the electric signal generated at the photodetector when the test sample is not disposed between the first quarter-wave plate and the second quarter-wave plate is compared with the transmission electric signal when the test sample is disposed between the first quarter-wave plate and the second quarter-wave plate and the stress of the test sample is determined, wherein the method comprising: input of the electric signal in a DC-voltage indicator to cause the indicator to indicate the detected value; rotating the polarizer about the light path axis such that the transmission principal axis S perpendicular to the light path is positioned orthogonally to the oscillation direction F of the linear modulation polarized wave and the minimum value that the DC-voltage indicator indicates becomes M; then, rotating the polarizer +45 degrees such that the DC-voltage indicator indicates a predetermined increased value M0 (M0>M); rotating the analyzer such that the principal axis S2 thereof is positioned orthogonally to the principal axis S of the polarizer whereby the linear modulation polarized wave arriving at the photodetector decreases and the minimum value that the DC-voltage indicator indicates becomes Mm1; then, rotating the polarizer such that the principal axis S thereof is positioned orthogonally to the principal axis S2 of the analyzer whereby the minimum value that the DC-voltage indicator indicates further decreases to Mm2; repeating these operations such that the value that the DC-voltage indicator indicates gradually decreases to Mmn (Mm1>Mm2> . . . >Mmn); rotating the photoelastic modulator such that the principal axis W thereof matches the principal axis S of the polarizer whereby the minimum value that the DC-voltage indicator indicates becomes Mx; rotating the first quarter-wave plate such that the principal axis H thereof matches the principal axis S of the polarizer whereby the minimum value that the DC-voltage indicator indicates decreases to Mxm; then, rotating the first quarter-wave plate +45 degrees such that the value that the DC-voltage indicator indicates becomes a predetermined increased value Mx1 (Mx1>Mxm); rotating the second quarter-wave plate such that the principal axis J thereof is positioned orthogonally to the principal axis H of the first quarter-wave plate whereby the minimum value that the DC-voltage indicator indicates decreases to Mx1$m$ (Mx1>Mx1$m$); finally rotating the polarizer +45 degrees such that the principal axis S thereof and the principal axis S2 of the analyzer forms an angle whereby the value that the DC-voltage indicator indicates increases to x1$m$ (x1$m$>Mx1$m$) which is a reference electric signal; supplying the reference electric signal to the DC-voltage indicator and an amplifier, wherein the amplifier amplifies the reference electric signal and supplies the amplified signal to a signal processor, and the signal processor generates reference signal data; then, disposing a test sample between the first quarter-wave plate and the second quarter-wave plate, passing the modulation polarized wave there through, at this time the photodetector generates a transmission electric signal and supplies the transmission electric signal to the DC-voltage indicator and the amplifier, wherein the amplifier amplifies the transmission electric signal and supplies the amplified signal to the signal processor, and the signal processor generates transmission signal data; and then, comparing the reference signal data with the transmission signal data and determining the stress of the test sample.

According to the second invention, there is provided a device for measuring stress using laser photoelasticity, comprising: a laser light source which produces infrared laser light; a polarizer, disposed on the light path of the laser light, upon which the laser light is incident and which outputs a linearly polarized wave that oscillates in a fixed direction; a photoelastic modulator upon which the linearly polarized wave is incident and which outputs a modulation polarized wave that continuously changes from linearly polarized light to circularly polarized light at a predetermined frequency; a first quarter-wave plate and a second quarter-wave plate upon which the modulation polarized wave is incident in this order; an analyzer upon which the modulation polarized wave is then incident and which outputs a linear modulation polarized wave which oscillate in another direction; a photodetector upon which the linear modulation polarized wave is incident and which outputs an electric signal corresponding to a physical property thereof; and a signal processor which compares the electric signal generated at the photodetector when a test sample is not disposed between the first quarter-wave plate and the second quarter-wave plate with the transmission electric signal when a test sample is disposed between the first quarter-wave plate and the second quarter-wave plate and the modulation polarized wave is passed there through, and determines the stress of the test sample, wherein the device for measuring stress further comprises a DC voltage indicator which receives the electric signal that the photodetector generates and indicates the detected numeric value in a DC-voltage indicator to cause the indicator to indicate the detected value, and an amplifier which receives and amplifies the reference electric signal that the photodetector generates; the polarizer is rotated and positioned such that the transmission principal axis thereof is positioned orthogonally to the oscillation direction of the laser light whereby the minimum value that the DC voltage indicator indicates becomes M, and then the polarizer is rotated +45 degrees such that the value that the DC-voltage indicator indicates becomes a predetermined increased value M0 (M0>M); the analyzer is rotated such that the principal axis thereof is positioned orthogonally to the principal axis of the polarizer whereby the linear modulation polarized wave arriving at the photodetector decreases and the minimum value that the DC-voltage indicator indicates becomes Mm1; then, the polarizer is rotated such that the principal axis S thereof is positioned orthogonally to the principal axis of the analyzer whereby the minimum value that the DC-voltage indicator indicates further decreases to Mm2; these operations are repeated whereby the angular position of the polarized and the analyzer is set such that the value that the DC-voltage indicator indicates gradually decreases to Mmn (Mm1>Mm2> . . . >Mmn); the photoelastic modulator is rotated such that the principal axis W thereof matches the principal axis S of the polarizer whereby the angular position is set such that the minimum value that the DC-voltage indicator indicates becomes Mx; the first quarter-wave plate is rotated such that the principal axis H thereof matches the principal axis S of the polarizer whereby the angular position is set such that the minimum value that the DC-voltage indicator indicates decreases to Mxm; the first quarter-wave plate is rotated +45 degrees whereby the angular position is set such that the value that the DC-voltage indicator indicates becomes a predetermined increased value Mx1 (Mx1>Mxm) and the first quarter-wave plate has a property to convert the modulation polarized light from the photoelastic modulator to swirling linearly-polarized light; in order that the swirling of the linearly polarized light imparted by the first quarter-wave plate is countered when the second quarter-wave plate receives the linearly polarized light, the second quarter-wave plate is rotated whereby the angular position is set such that the principal axis thereof is positioned orthogonally to the principal axis direction of the first quarter-wave plate and the minimum value that the DC voltage indicator indicates decreases to Mx1$m$ (Mx1>Mx1$m$); the polarizer is further rotated +45 degrees such that the principal axis thereof and the principal axis of the analyzer forms an angle, and the value that the DC-voltage indicator indicates is set as a reference electric signal of an increased value x1$m$ (x1$m$>Mx1$m$); the signal processor receives the reference electric signal amplified by the amplifier and generates reference signal data; and then, a test sample is disposed between the first quarter-wave plate and the second quarter-wave plate, the modulation polarized wave is passed there through, at this time, the photodetector generates a transmission electric signal and supplies the transmission electric signal to the amplifier, the amplifier amplifies the transmission electric signal and supplies the amplified signal to the signal processor, and the signal processor generates transmission signal data, and the signal processor compares the reference signal data with the transmission signal data and determines the stress of the test sample.

According to the third invention, the device for measuring stress further comprises a thermostatic element having a cooling part and a heat radiation part which operate when power is applied thereto, wherein the photodetector is integrally placed adjacent to the cooling part.

According to the fourth invention, a phase plate having a known phase difference is disposed as a test sample between the first quarter-wave plate and the second quarter-wave plate of the stress measurement device of the second invention, and transmission signal data is obtained at least twice while rotating the phase plate, based on which the phase difference of a test sample having an unknown phase difference is determined, and the phase difference thereof is converted to stress by the use of the photoelastic constant.

BRIEF DESCRIPTION OF THE DRAWINGS

FIG. 5 is a diagram showing polarization states at a subsequent step after measurement, for illustrating the residual stress measurement method of the invention.

BEST MODE FOR CARRYING OUT THE INVENTION

The method and device of the invention will be described below in connection with the drawings. The method of measuring stress using laser photoelasticity and a device there for is also referred to as birefringence phase difference and a device there for.

Figure 1:
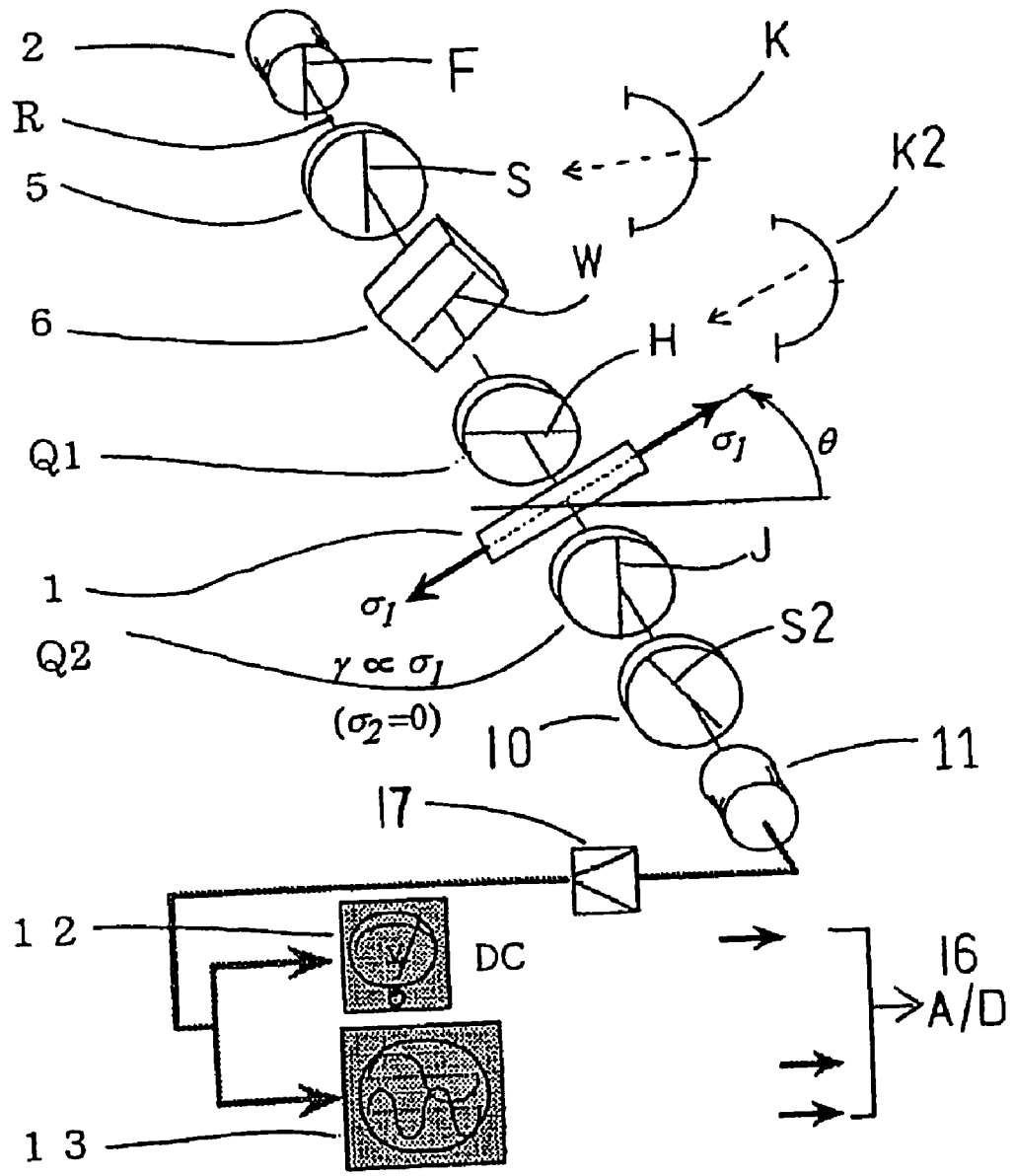
FIG. 1 is a perspective view showing the main structure of a stress measurement device of the invention including a lock-in amplifier.

First, the basic structure of a birefringence phase difference measurement device is shown in FIG. 1. FIG. 1 shows this device as viewed slantwise for illustrating the polarization principal axis and optical wave oscillation direction of each optical element. In FIG. 1, a laser light source 2 generates laser light R having a wavelength range of 170 nm to 2600 nm (infrared wavelength).

While the infrared rays are not visible to the human eye, they can be easily transmitted through a semiconductor wafer 1 which is used as a sample. Therefore, the infrared rays are optimum for use in the measurement and inspection devices of the invention.

The laser light R from the laser light source (He—Ne Laser) 2 passes through a collimator lens 3 and a focal lens 4 and arrives at a polarizer 5, a PEM (photoelastic modulator) 6, a first quarter-wave plate Q1, a second quarter-wave plate Q2, an analyzer 10 and a photodetector 11.

The photoelastic modulator PEM 6 outputs a modulation polarized wave which continuously changes from incident linearly polarized light to circularly polarized light at a predetermined frequency. A modulation control unit 15 shown in FIG. 2 controls modulation at PEM 6 so as to change the modulation frequency to a predetermined frequency.

The photodetector 11 converts the laser light R into an electric current. This analog detection signal is transmitted to a signal conditioning module 17 which is composed of a current/voltage converter circuit, signal amplifier circuit and filter circuit, in which the analog detection signal is filtered into a DC voltage signal and an AC voltage signal. The DC voltage signal and the AC voltage signal are respectively directed to a DC-voltage indicator 12 and a lock-in amplifier 13.

The lock-in amplifier 13 is composed of a current/voltage converter circuit, an amplifier circuit, a low-pass filter circuit and a high-pass filter circuit. The lock-in amplifier 13 measures and amplifies the AC voltage signal, and then sends the signal to an analog/digital converter 16 shown in FIG. 2 which converts the analog detection signal into a digital signal.

Furthermore, the DC voltage signal from the signal conditioning module 17 is also sent to the analog/digital converter 16 wherein the analog detection signal is converted into a digital signal.

The DC-voltage indicator 12 is provided such that an observer can perform optical-axis alignment of respective relevant components and control the polarization direction while monitoring the detection signal voltage. These digital signals are sent to a signal processor 14 such as a personal computer or sent to a data processor (not shown).

Figure 3:
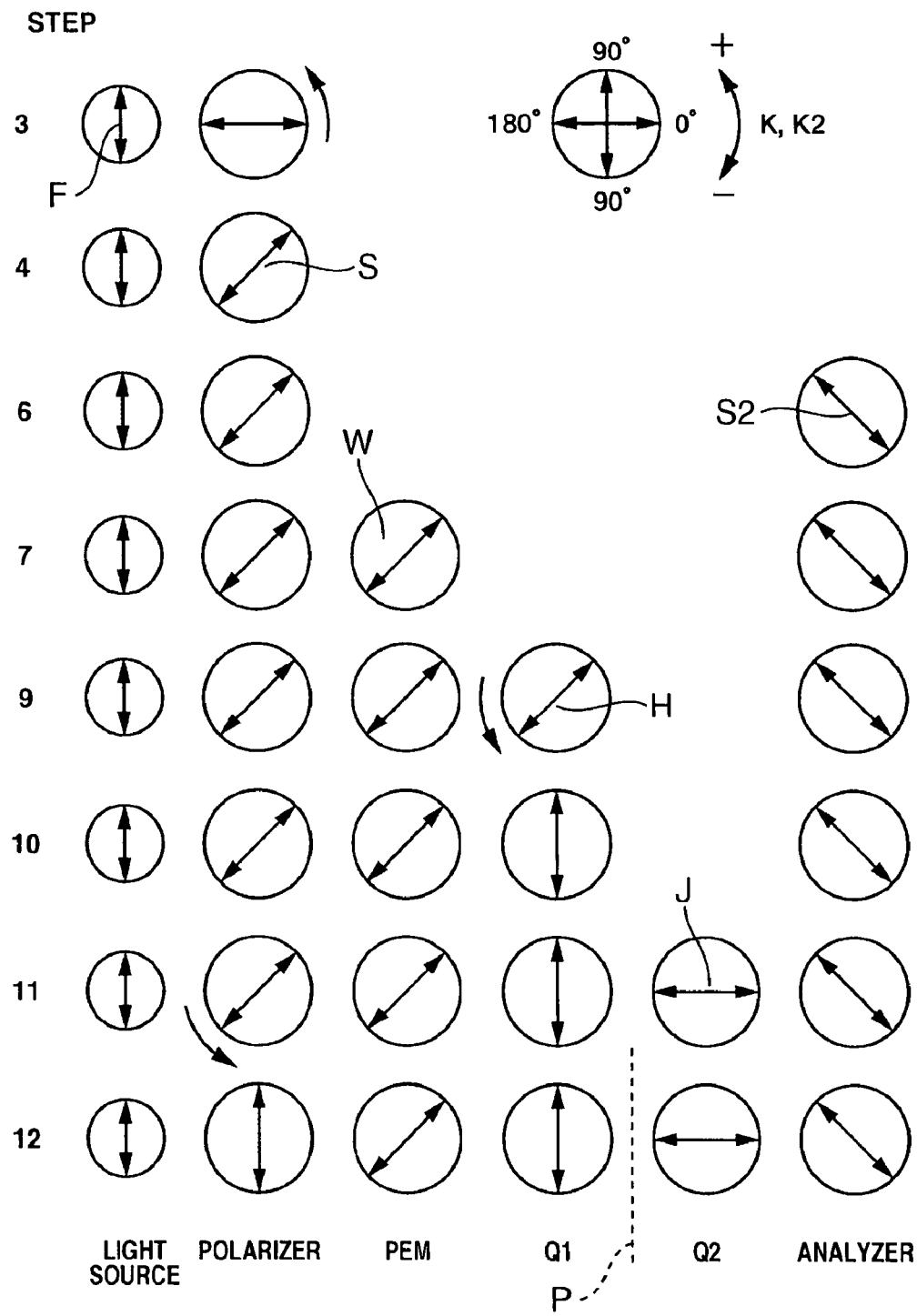
FIG. 3 is an angular positioning diagram of the structure in FIG. 1, for illustrating the residual stress measurement method of the invention.

The sample semiconductor wafer 1 whose stress is subjected to inspection and measurement is disposed between the first quarter-wave plate Q1 and the second quarter-wave plate Q2. In FIG. 3, the sample semiconductor wafer 1 is positioned between the first quarter-wave plate Q1 and the second quarter-wave plate Q2 as a position P indicated by the dashed lines.

As shown in FIG. 1, the laser light R is, for example, polarized light consisting of oscillation direction F components. By securing and locking the laser light source 2 to a predetermined support, the oscillation direction F of the laser light R is held thereafter.

Furthermore, if the degree of linear polarization is good, the analyzer 5 may not always be necessary. In this case, however, to rotate the polarization direction of the laser light R when setting the respective elements, the laser light source is required to be rotated like a polarizer. Thus, while only when setting (setting up) the respective elements, a labor-intensive process is added. However, this reduces the cost of the entire device.

The collimator lens 3 and the focal lens 4 are secured to a predetermined support and the position thereof is adjusted so that the laser light R is condensed and the spot size thereof is determined.

Figure 2:
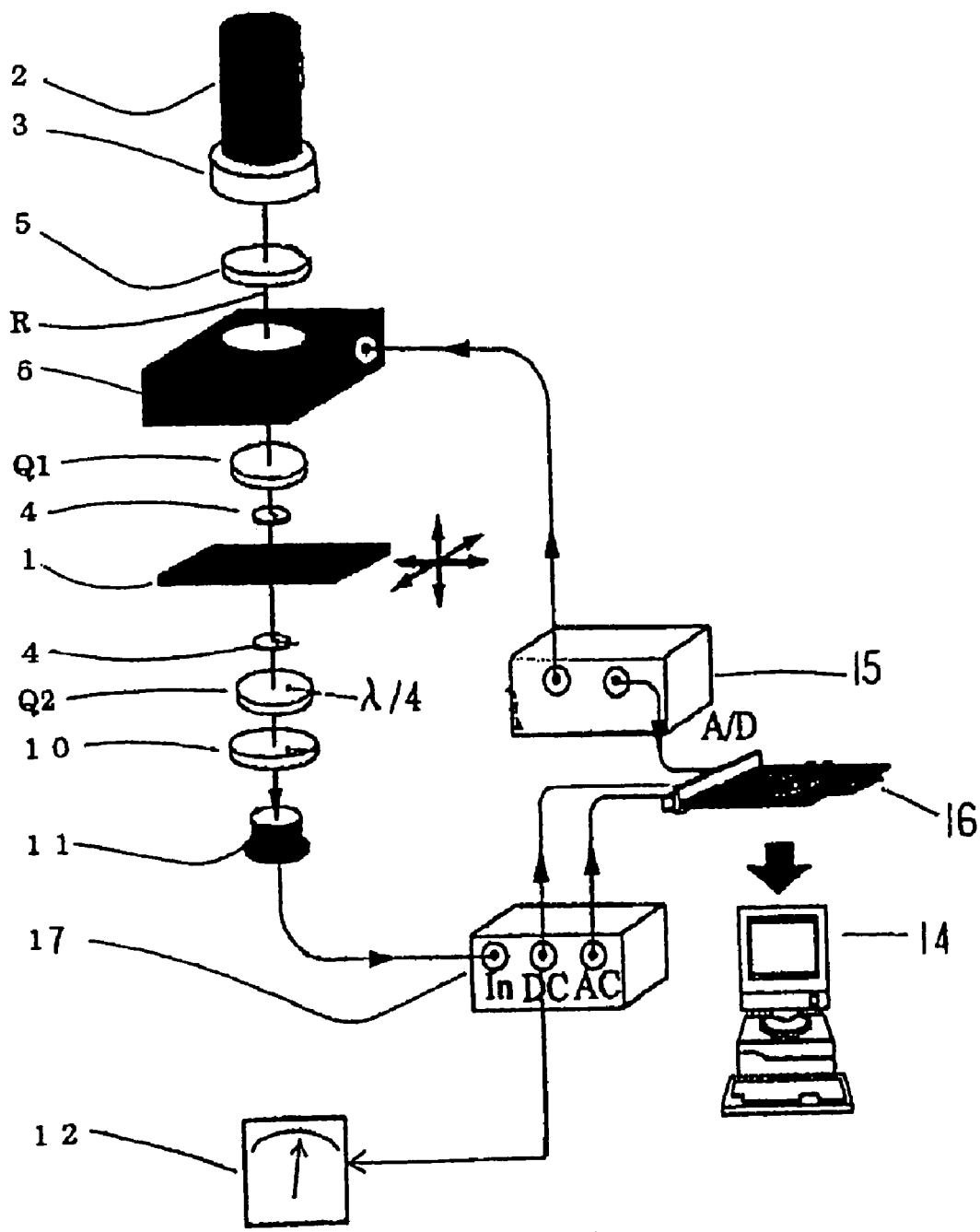
FIG. 2 is a side view showing the main structure of a stress measurement device of the invention including a computer provided with a lock-in amplification function.

As shown in FIG. 2, it is also possible to provide two focal lenses 4 between the first quarter-wave plate Q1 and the second quarter-wave plate Q2 such that the sample semiconductor wafer 1 is interposed there between.

The polarizer 5 has a principal axis direction S along which the laser light R is converted into a linearly polarized wave oscillating in a fixed direction and the linearly polarized wave is transmitted. The polarizer is held on a predetermined support such that the principal axis direction S is rotatable. An angular scale K is positioned in the vicinity of the polarizer 5 such that the rotational angle of the principal axis direction S can be read.

The PEM 6 has a principal axis direction W along which the laser light R is transmitted. The modulation frequency applied by the PEM control unit 15 is, for example, 42 kHz. The modulation frequency is determined according to the resonance frequency of an oscillating crystal used in the PEM. The laser light R transmitted through the PEM 6 has been subjected to phase modulation.

The first quarter-wave plate Q1 and the second quarter-wave plate Q2 respectively have a principal axis direction H and a principal axis direction J along which the laser light R is transmitted. The phase difference error when the quarter-wave plates Q1 and Q2 are manufactured is ±0.5%. The analyzer 10 has a principal axis direction S2 along which the laser light R is transmitted.

The photodetector 11 generates an electric current corresponding to the strength of the laser light R transmitted through the analyzer 10. Since the PEM 6 and the modulation control unit 15 are products available in the global market and used merely as components, no further description will be made thereon.

The photodetector 11 is a photoelectric conversion element physically surrounded by a thermostatic element having a cooling part and a heat radiation part which operate when power is applied thereto. The laser light R is an infrared ray which can be transmitted through a semiconductor wafer. The infrared photodetector 11 outputs an infrared signal when the ambient temperature changes. Therefore, under the circumstances where the ambient temperature changes, it cannot discriminate a subtle change in a received infrared ray from an ambient temperature change.

According to the invention, this problem is solved by integrally disposing the photodetector 11 adjacent to the cooling part.

For example, for a thermostatic element (Peltier cooler) having a cooling part formed inside a cylinder and a heat radiation part formed outside a cylinder, the photoelectric conversion element is positioned and cooled at the cooling part within the cylinder. Such a constant-temperature photodetector 11 is made up of a known material.

A residual stress measurement method, especially relating to how to set and position each optical element will be described below with reference to FIG. 1 and FIG. 2 and according to FIG. 3.

Hereinafter, each operational step will be described with a step number being assigned thereto. FIG. 3 shows the principal axis direction of each optical element at each step as viewed from the front side of the drawing (FIG. 1).

First, in step 1, for the purpose of making the entire device stable, a laser light source 2, a PEM 6, a photodetector 11, a DC voltage indicator 12, a lock-in amplifier 13, a personal computer 1/4, a modulation control unit 15, and a data processor are turned on about 4 hours before starting the measurement.

A residual stress measurement method, especially relating to how to set and position each optical element will be described below with reference to FIG. 1 and FIG. 2 and according to FIG. 3.

Hereinafter, each operational step will be described with a step number being assigned thereto. FIG. 3 shows the principal axis direction of each optical element at each step as viewed from the front side of the drawing (FIG. 1).

First, in step 1, for the purpose of making the entire device stable, a laser light source 2, a PEM 6, a photodetector 11, a DC voltage indicator 12, a lock-in amplifier 13, a personal computer 14, a modulation control unit 15, and a data processor are turned on about 4 hours before starting the measurement.

The laser light R is not visible to the human eye. Therefore, in step 2, by means of a modified CCD camera or a infrared viewer (not shown), position adjustment and verification are performed such that the infrared ray R from the laser light source 2 impinges upon the photodetector 11, i.e., the infrared ray R is transmitted through center of each element secured to a predetermined holder such that the elements are aligned to each other.

At this stage, the laser light R arrives at the photodetector 11 through the aforementioned optical elements. An electric signal generated at the photodetector 11 is sent to the DC voltage indicator 12 and indicated as a voltage value by means of an indicating needle, digital meter, or a numeral.

In FIG. 3, in step 3, the polarizer 5 is rotated such that the oscillation direction F of the laser light R is positioned orthogonally to the transmission principal axis S, so that the laser light R arriving at the photodetector 11 is reduced and the minimum value that the DC-voltage indicator indicates becomes M. Specifically, the principal axis direction S of the polarizer is positioned orthogonally to the oscillation direction F of the infrared He—Ne laser light R.

In step 4, the polarizer is rotated +45 degrees (counter-clockwise rotation as viewed in the drawing) using the angular scale K such that half of the laser light is transmitted to the subsequent optical path (finally, the oscillation direction F of the infrared He—Ne laser light R completely matches with the principal axis direction S of the polarizer 5).

In step 5, an auto-set button and a phase-set button of the lock-in amplifier 13 are depressed for initialization.

Furthermore, it is also possible that the operation of the lock-in amplifier 13 is placed on the personal computer 14. In this case, the function of the lock-in amplifier 13 is realized by software within the personal computer 14.

In step 6, the principal axis direction S of the polarizer 5 is positioned orthogonally to the principal axis direction S2 of the analyzer 10 located on the light receiving side, so that the laser light R arriving at the photodetector 11 is reduced and the minimum value that the DC-voltage indicator indicates becomes Mm1.

Rotation of the principal axis direction S2 of the analyzer 10 is performed by an observer by hand or by a predetermined mechanism. Thus, it is difficult to accurately orthogonalize the principal axis direction S to the principal axis direction S2 in a single go.

For this reason, first, the polarizer 5 is locked and the analyzer 10 is rotated such that the value that the DC voltage indicator 12 indicates becomes Mm1. Then, the analyzer 10 is locked and the polarizer 5 is rotated such that the minimum value that the DC voltage indicator indicates becomes Mm2. At this time, however, it is necessary to remember that adjustment is performed by rotating the analyzer 10 without rotating the polarizer 5 as much as possible.

This is because if the polarizer 5 is rotated, change of the transmitted light is caused between the polarization direction F at the light source and S. At the same time, change of the transmitted light is also caused between S and S2. Accordingly, it becomes unclear whether F or S2 influences the change of the light amount arriving at the photodetector 11. Therefore, it is desirable to rotate the analyzer 10 to obtain the minimum value Mmn as much as possible, while slightly rotating the polarizer 5 as an aid.

The aforementioned procedure is repeated such that the minimum value that the DC voltage indicator 12 indicates becomes Mmn such that the principal axis direction S is accurately and precisely positioned orthogonally to the principal axis direction S2 (Mm1>Mm2> ... >Mmn). To make the value that the DC voltage indicator 12 indicates as small as possible, at least 3 hours would be required even by an expert.

Furthermore, the minimum value Mmn of the direct voltage indicator 12 is infinitely approximate to being perfectly orthogonal (converged to zero). However, being perfectly orthogonal cannot be achieved. Thus, due to the dark current of the photodetector 11, some value Mmn is indicated.

In step 7, the PEM 6 disposed between the polarizer 5 and the analyzer 10 is turned on and set to its user (USR) mode (functions of the PEM 6 are activated). This time, the PEM 6 is rotated, i.e. the direction of the principal axis direction W of the PEM 6 is rotated whereby adjustment is performed such that the minimum value that DC voltage indicator 12 indicates becomes Mx.

At this time, the principal axis direction S of the polarizer 5 and the principal axis direction W of the PEM 6 are caused to be finally converged with each other at a matched position. (The laser light R is blocked if the principal axis direction S is matched with the principal axis direction W. In fact, however, these axes can be converged with each other but cannot be completely matched with each other. For convenience, herein, this state is referred to as "matched".)

In step 8, after confirming that the minimum value Mx of the DC voltage indicator does not change even when the PEM 6 is set to its inhibition (INH) mode (functions of the PEM 6 are deactivated), the setting of the PEM 6 is returned to USR mode.

In step 9, the first quarter-wave plate Q1 disposed between the PEM 6 and the analyzer 10 is rotated whereby adjustment is performed such that the minimum value that the DC voltage indicator 12 indicates becomes Mxm≅Mx. The principal axis direction S of the polarizer 5 and the principal axis direction H of the quarter-wave plate Q1 are caused to be approximately matched.

In step 10, the first quarter-wave plate Q1 is rotated +45 degrees using an angular scale K2 whereby adjustment is performed such that the minimum value that the DC voltage indicator 12 indicates becomes Mxm1>Mxm≅Mx (this adjustment should be performed accurately by the use of a vernier or the like in the manner of vernier calipers).

In step 11, the second quarter-wave plate Q2 disposed between the first quarter-wave plate Q1 and the analyzer 10 is rotated such that the principal axis direction J of the second quarter-wave plate Q2 is positioned orthogonally to (converged with) the principal axis direction H of the first quarter-wave plate Q1 whereby adjustment is performed such that the minimum value that DC voltage indicator 12 indicates becomes Mx1$m$<mx1.

In step 12, the first polarizer 5 is further rotated +45 degrees using the angular scale K whereby adjustment is performed such that the minimum value that the DC voltage indicator 12 indicates becomes xm1>Mx1$m$ In the state where the value that the DC voltage indicator 12 indicates is the minimum value x1$m$, the laser light R arriving at the photodetector 11 is subjected to a half block effect of the principal axis direction W of the PEM 6 and a (imperfect) full block effect (phase difference generation effect) of the principal axis direction H of the first quarter-wave plate Q1 and the principal axis direction J of the second quarter-wave plate Q2.

Here, the symbol "−" indicates a clockwise direction while the symbol "+" indicates a counterclockwise direction as viewed from the front of the drawing (for the cases of FIG. 1 and FIG. 3).

Figure 4:
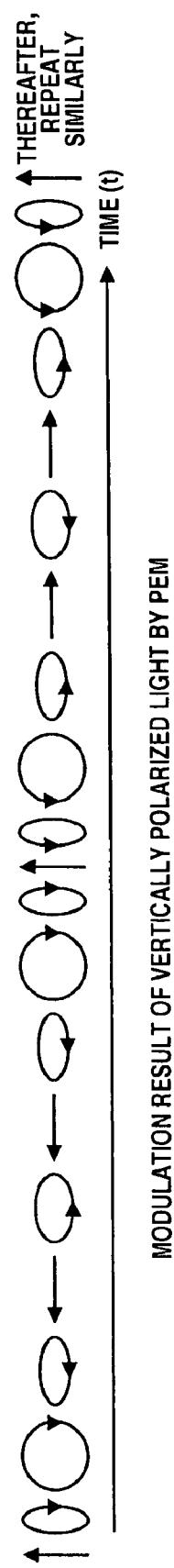
FIG. 4 is a diagram showing polarization states at a previous step before measurement, for illustrating the residual stress measurement method of the invention.

In the state of step 12, since the principal axis direction S of the polarizer 5 is inclined +45 degrees, the PEM 6 outputs a modulation polarized wave which modulates the incident linearly-polarized light of the laser light R to circularly polarized light at a predetermined frequency with a state alternating (regularly repeated) linearly polarized light and elliptically polarized light as shown in FIG. 4.

This modulating polarized light is continuously modulated at a frequency of 42 kHz applied by the modulation control unit 15 with time t as shown from the left side to the right side as viewed in FIG. 4.

This modulation polarized wave is impinged upon the first quarter-wave plate Q1 in which the polarized wave becomes linearly polarized light with the direction shown by a solid line arrow as shown in FIG. 5. This linearly polarized light is continuously transmitted through the sample while rotating (swirling) at a frequency of 42 kHz with time t as shown from the left side to the right side as viewed in FIG. 5.

This swirling linearly-polarized light is impinged upon the second quarter-wave plate Q2. In the second quarter-wave plate Q2 positioned orthogonally (to Q1), the swirling linearly-polarized light by the first quarter-wave plate Q1 is demodulated and returned to modulating polarized light wherein linearly polarized light and elliptically polarized light are regularly alternated as shown in FIG. 4. The demodulated light arrives at the analyzer 10. However, when a sample is set between Q1 and Q2, the light is not completely demodulated. Thus, based on the comparison between a known completely demodulated state and an unknown incompletely demodulated state, the phase difference of the sample is measured.

As long as the setting of the present device from step 3 to step 12 is performed in the initial stages of assembling the device and the arrangement relationship between respective optical elements is maintained at this setting state without disturbance, such as an earthquake, there is no need to reset the device unless any variation due to secular fatigue occurs.

Measurement operations will be described below.

In the state of step 12, almost all of the light of the laser light R from the laser light source 2 passes through the collimator lens 3, the focal lens 4 and the polarizer 5 (the oscillation direction F is parallel to the principal axis direction S), and is incident upon the PEM.

Upon the light path of the laser light R, the principal axis direction W of the PEM 6 is angled 45 degrees relative to the principal axis direction S of the analyzer 5. A predetermined amount of the laser light R is then impinged upon the first quarter-wave plate Q1.

Here, the PEM 6 is in its USR mode wherein the laser light R (for example, having a wave length λ=1150 nm) from the polarizer is subjected to phase modulation, for example, at a modulation frequency of 42 kHz, i.e., 42,000 cycles.

With time t as shown from the left side to the right side as viewed in FIG. 4, the photoelastic modulator of the PEM 6 continuously modulates the laser light R of linearly polarized light waves from linearly polarized light to circularly polarized light at a predetermined frequency of 42 kHz, thereby providing (phase) modulation polarized waves.

Specifically, the PEM 6 applies the birefringence phase difference, which is proportional to an applied voltage changing at 42 kHz, to the laser light R of linearly polarized waves.

This modulation polarized wave is impinged upon the first quarter-wave plate Q1 in which the polarized wave becomes linearly polarized light with the direction shown by a solid line arrow as shown in FIG. 5. This linearly polarized light is continuously transmitted through the sample while rotating (swirling) at a frequency of 42 kHz with time t as shown from the left side to the right side as viewed in FIG. 5.

This swirling linearly-polarized light is impinged upon the second quarter-wave plate Q2. In the second quarter-wave plate Q2 positioned orthogonally (to Q1), the swirling linearly-polarized light is demodulated and returned to the linearly polarized light as previous and arrives at the analyzer 10.

However, when a sample 1 is set between Q1 and Q2, the light is not completely demodulated. Thus, based on the comparison between a known completely demodulated state and an unknown incompletely demodulated state, the phase difference of the sample is measured.

Here, the definition of birefringence will be described. A light wave is decomposed into plane waves and progresses which respectively oscillate vertically and horizontally. When they are transmitted through an isotropic homogeneous substance (medium), the progression rates (phases) thereof are equal to each other. However, when they are transmitted through a dielectric anisotropic substance such as a semiconductor wafer, the progression rates (phases) of the vertical and horizontal plane waves become different from each other. The phase difference (rate difference) between these two lane waves is called birefringence.

On the other hand, at PEM 6, the laser light R is subjected to the photoelastic modulation shown in FIG. 4 whereby it is changed to phase-modulating polarized light wherein linearly polarized light and elliptically polarized light are regularly alternated, and then changed to swirling linearly-polarized light at the first quarter-wave plate Q1.

Since a phenomenon reverse to that of Q1 takes place at the second quarter-wave plate Q2, the laser light R incident upon Q2 is demodulated to a phase-modulating polarized light wherein linearly polarized light and elliptically polarized light are regularly alternated.

However, the degree of the demodulation varies depending on the scale of the birefringence phase difference and the birefringence direction of the sample. However, while not necessarily perfectly, the light returns to the phase-modulating polarized light wherein linearly polarized light and elliptically polarized light are regularly alternated. The repetition of linearly polarized light and elliptically polarized light provides a polarized wave which intermittently contains the principal axis direction S2. Accordingly, the light can pass through the analyzer 10, arrives at the photodetector 11, and generates an electric current, i.e., reference electric signal, including an alternating current part corresponding to the strength thereof.

This reference electric signal is input to the signal conditioning module 17 wherein a DC component and an AC component of the input signal are separated by means of a current/voltage converter circuit, the amplifier circuit, and the filter circuits. The DC component is supplied to the DC voltage indicator 12 which monitors the voltage thereof, and then input to the analog/digital converter 16. The AC component is supplied to the lock-in amplifier 13 which measures the alternating voltage thereof, and the alternating voltage is input to the analog/digital converter 16. The computer 14 carries out mathematical computations using the received digital signal and stores the result in memory. The mathematical computations within the computer are performed based on a formula obtained by the known Fourier analysis.

Furthermore, the operation of the lock-in amplifier 13 may be placed on a signal processor 14 of the personal computer using a program.

In this case, a reference electric signal is input to the amplifier 13 for amplification, the amplified reference electric signal is then sent to the analog/digital converter 16 wherein the analog detection signal is converted to a digital signal. This digital reference electric signal is then input to the signal processor 14. The reference electric signal containing the alternating current part is subjected to a spectrum analysis for each frequency in the signal processor whereby reference signal data is produced.

Since the reference signal data generate a birefringence phase difference since the laser light R of a polarized wave is subjected to photoelastic modulation at the PEM 6. This is detected after it passes through the first quarter-wave plate Q1 and the second quarter-wave plate Q2. This reference signal data is stored in a predetermined memory of the signal processor 1/4.

After that, a sample semiconductor wafer 1 is disposed between the quarter-wave plate Q1 and the second quarter-wave plate Q2 at a position indicated by the dashed lines P shown in FIG. 3.

The sample is not limited to a semiconductor wafer, but may be liquid. Specifically, the present device can be also used as a device for detecting substances separated by high-speed liquid chromatography (HPLC) and therefore can be applicable in the chemical field.

According to the present method, stress measurement is an example of application. Specifically, a phase difference measurement is performed and stress can be determined based on the phase difference. Furthermore, a specific substance can be detected. Therefore, the present method is not limited to stress measurement.

The modulation polarized wave from the PEM 6 is transmitted through the first quarter-wave plate Q1, the semiconductor wafer 1 and the second quarter-wave plate Q2 in this order.

On the other hand, at PEM 6, the laser light R is subjected to the photoelastic modulation shown in FIG. 4 whereby it is changed to phase-modulating polarized light which regularly alternates linearly polarized light and elliptically polarized light, and then changed to swirling linearly-polarized light at the first quarter-wave plate Q1. When the linearly polarized light is passed through a test piece, the direction and magnitude of the stress of the test piece can be explored by the following method, and the direction of the stress of the test piece can be detected when the angle between the direction of the stress and the linear polarization light is 0 and 90 degrees. The magnitude of the stress can be first detected when the angle between the direction of the stress and the linear polarization light is 45 degrees.

Thus, by launching the swirling linearly-polarized light into a sample, the direction and magnitude of the stress of the test piece can be measured without rotating the test piece and the optical system.

Specifically, the laser light R of polarized wave subjected to photoelastic modulation in the PEM 6 and passed through the quarter wavelength plate Q1 has a birefringence phase difference. For example, a principal axis J component separated from a principal axis H component is generated and passes through a semiconductor wafer D having a residual stress.

At this time, the aforementioned condition is satisfied. When the linearly polarized light is passed through a test piece, the direction and magnitude of the stress of the test piece can be explored by the following method, and the direction of the stress of the test piece is detected when the angle between the direction of the stress and the linear polarization light becomes 0 and 90 degrees as time progresses.

The magnitude of the stress can be first detected when the angle between the direction of the stress and the linear polarization light becomes 45 degrees as time progresses.

At this time, the light is further subjected to photoelastic modulation corresponding to the physical quantity of the stress, which generates additional birefringence phase difference. Then the light is passed through (incident upon) the second quarter-wave plate Q2. The light wave incident upon Q2 is demodulated to a phase-modulating polarized light wherein linearly polarized light and elliptically polarized light are regularly alternated. However, the degree of the demodulation varies depending on the scale of the birefringence phase difference and the birefringence direction of the sample. However, while not necessarily perfectly, the light returns to the phase-modulating polarized light wherein linearly polarized light and elliptically polarized light are regularly alternated. The repetition of linearly polarized light and elliptically polarized light provides a light wave which intermittently contains the principal axis direction S2.

Accordingly, the light wave passes through the analyzer 10 (the laser light R having the additional birefringence phase difference further passes the analyzer 10 having the particular axis S2), arrives at the photodetector 11, and generates an electric current corresponding to the strength thereof.

This reference electric signal is input to the signal conditioning module 17 wherein a DC component and an AC component of the input signal are separated by means of a current/voltage converter circuit, an amplifier circuit, and filter circuits. The DC component is supplied to a DC voltage indicator 12 which monitors the voltage thereof, and then input to the analog/digital converter 16.

The AC component is supplied to the lock-in amplifier 13 which measures the alternating voltage thereof, and the alternating voltage is input to the analog/digital converter 16. The computer 1/4 carries out mathematical computations using the received digital signal and stores the result into predetermined memory. The mathematical computations within the computer are performed based on a formula obtained by the known Fourier analysis.

The laser light R of a polarized wave, which was subjected to photoelastic modulation in the PEM 6, passed through the quarter wavelength plate Q1, further subjected to photoelastic modulation in the semiconductor wafer 1, and passed through the second quarter wavelength plate Q2, is not completely demodulated since the sample is disposed between Q1 and Q2. Thus, the result of the aforementioned computation is the phase difference of the sample derived from the comparison between a known completely demodulated state and an unknown incompletely demodulated state.

That is, the transmitted electric signal is input to the amplifier 13 for amplification, the amplified transmitted electric signal is then sent to the analog/digital converter 16 wherein the analog detection signal is converted to a digital signal. The digital signal is delivered to a signal processor 14 such as a personal computer or the like, wherein transmission signal data is generated.

This transmission signal data is based on the birefringence phase difference containing additional laser light R which was subjected to photoelastic modulation in the PEM 6, passed through the quarter wavelength plate Q1, further subjected to photoelastic modulation in the semiconductor wafer 1, and passed through the second quarter wavelength plate Q2. This transmission signal data is stored in a predetermined memory of the signal processor 14.

Based on the computed birefringence phase difference, the signal processor 14 determines the stress and distortion of the sample 1 using a known computation technique, or detects trace substances thereof.

That is, the signal processor 14 reads out the stored reference signal data and the transmission signal data, performs a predetermined computation thereon, and compares them with each other thereby determining the reference birefringence phase difference and the absolute values of the additional birefringence refraction phase difference.

Furthermore, the signal processor 14 substitutes the reference birefringence phase difference and the absolute values of the additional birefringence refraction phase difference into a predetermined physicality formula or equation, and thereby determines the residual stress of the semiconductor wafer 1.

Any material transmissive to the laser light R may be used instead of the sample semiconductor wafer. For example, regardless of transparency, semi-transparency and the shape, the invention may be applicable to various materials, such as plastic, ceramic, epoxy resin and acrylic resin in a sheet form or in a block form, and a cellophane film as thin as 10 μm or less, for measuring its birefringence phase difference and determining (converting to) the stress and distortion thereof.

Furthermore, by converging the beam of the laser light R, the mean magnitude and direction of the birefringence within a range having a diameter of 10 μm can be measured.

According to the method and device of the invention, absolute measurement of the magnitude and direction of a birefringence phase difference with a very low error rate (±3.14 nm) becomes possible. However, this error rate includes the ±144 nm that is the error rate of the phase plate having a known phase difference used for calibration of the device. In other words, this error rate is a generous estimate. When the error rate ±3.14 nm is converted to the stress of an Si wafer having a thickness of 1 mm, it is about ±0.21 MPa. This is analogous to about a 21 g/mm$^2$ load. For the case of an Si wafer having a thickness of 0.6 mm (600 μm), the error rate is ±0.105 MPa. This is analogous to about a 10.5 g/mm$^2$ load.

Such subtle stress is very difficult to measure under normal temperature and normal pressure, and thus the measurement error is very small as described above. Furthermore, by appropriately changing the phase modulation amount and modulation frequency, based on the phase difference of the nanotechnology level, an absolute magnitude with an accuracy as high as ±0.105 MPa could be practically detected.

In the present day where densification of ultra VLSI wafers (ultra-compact, ultra low power, ultra high speed, multifunction) is being enhanced, measurement of residual stress with high accuracy has become indispensable. This invention could soon be applied to a process for producing irrefrangible ultra VLSI elements.

Furthermore, according to the invention, the influence of the crystal upon the photoelastic property of a GaAs single crystal orientation was also verified by the use of a commercially available GaAs wafer having a thickness of 600 μm.

The influence of the light source wavelength exerted upon the relation between the photoelastic property and the crystal orientation was also verified in terms of rational and reliable wavelength region. Thus, the present invention is very advantageous from an industrial view point.

INDUSTRIAL APPLICABILITY

According to the present invention, measurement sensitivity and measurement accuracy are enhanced. When the present invention is introduced into the semiconductor industry, it would become very effective for productivity enhancement and quality control of semiconductor wafers. This would contribute to quality improvement and cost reduction of semiconductor products. As a result, it is considered that this invention would become a key technology for promoting economic vitalization of the country.

Furthermore, the birefringence phase difference measurement device of the invention does not have any rotational parts, so that there are no technical obstacles to enhancing measurement speed and measurement accuracy. Thus, when the device of the invention is introduced to the fast-moving semiconductor industry, a long service life and high cost efficiency would be ensured.

Furthermore, the applicable range of the birefringence phase difference measurement device of the invention is incomparably large, so that the application thereof can be expected not only in the semiconductor industry but also in a wide range of fields. From this point of view, its cost efficiency would be high.

Compared with the results of earlier studies, the validity of the measurement results of the present invention was verified. It became clear that the stress of an Si and GaAs wafer as thick as about 600 μm, which has been conventionally almost impossible to measure, can be measured with accuracy and speed. Furthermore, a new finding concerning the relationship between the distortion of an Si single crystal and birefringence was obtained. Furthermore, the distribution of the residual stress in commercially available GaAs wafers having a thickness of 600 μm was measured by scanning laser photoelastic experimental equipment and the relationship with crystal gliding became clear.

Furthermore, by cooling the light receiving elements and being kept at a constant temperature, the measurement sensitivity and accuracy (which can be received with low noise) was enhanced.

In the fast-moving semiconductor industry, it would be expected that the residual stress of the semiconductor wafer to be measured will further decrease. The present invention would be able to adapt thereto.

According to the birefringence phase difference measurement device of the invention, the measurement sensitivity and accuracy was enhanced whereby the measurement of the stress-strain state of a semiconductor wafer and semiconductor element, evaluation of perfection of various single crystals, and detection of substances separated by high performance liquid chromatography (HPLC) were realized.

The invention claimed is:

1. A method of measuring stress using laser photoelasticity, wherein an infrared laser beam from a laser source is impinged upon a polarizer in which the laser beam is converted into a linear polarized light wave that oscillates in a fixed direction on a plane perpendicular to the light path axis; the linear polarized light wave is impinged upon a photoelastic modulator, such that the optical axis matches the light path axis, in which a linear polarized light wave is converted into a modulation polarized wave that changes continuously from linearly polarized light to circularly polarized light with a predetermined frequency; the modulation polarized wave is passed through a first quarter-wave plate and a second quarter-wave plate in this order and impinged upon an analyzer in which the modulation polarized wave is converted into a linear modulation polarized wave that oscillates in another direction; the linear modulation polarized wave is impinged upon a photodetector in which an electric signal corresponding to the physical property of the linear modulation polarized wave is generated;

then, a test sample is disposed between the first quarter-wave plate and the second quarter-wave plate; the modulation polarized wave is passed there through; and the electric signal generated at the photodetector when the test sample is not disposed between the first quarter-wave plate and the second quarter-wave plate is compared with the transmission electric signal when the test sample is disposed between the first quarter-wave plate and the second quarter-wave plate and the stress of the test sample is determined, wherein the method comprising:

input of the electric signal in a DC-voltage indicator to cause the indicator to indicate the detected value;

rotating the polarizer about the light path axis such that the transmission principal axis S perpendicular to the light path is positioned orthogonally to the oscillation direction F of the linear modulation polarized wave and the minimum value that the DC-voltage indicator indicates becomes M;

then, rotating the polarizer +45 degrees such that the DC-voltage indicator indicates a predetermined increased value M0 (M0>M);

rotating the analyzer such that the principal axis S2 thereof is positioned orthogonally to the principal axis S of the polarizer whereby the linear modulation polarized wave arriving at the photodetector decreases and the minimum value that the DC-voltage indicator indicates becomes Mm1;

then, rotating the polarizer such that the principal axis S thereof is positioned orthogonally to the principal axis S2 of the analyzer whereby the minimum value that the DC-voltage indicator indicates further decreases to Mm2;

repeating these operations such that the value that the DC-voltage indicator indicates gradually decreases to Mmn (Mm1>Mm2> . . . >Mmn);

rotating the photoelastic modulator such that the principal axis W thereof matches the principal axis S of the polarizer whereby the minimum value that the DC-voltage indicator indicates becomes Mx;

rotating the first quarter-wave plate such that the principal axis H thereof matches the principal axis S of the polarizer whereby the minimum value that the DC-voltage indicator indicates decreases to Mxm;

then, rotating the first quarter-wave plate +45 degrees such that the value that the DC-voltage indicator indicates becomes a predetermined increased value Mx1 (Mx1>Mxm);

rotating the second quarter-wave plate such that the principal axis J thereof is positioned orthogonally to the principal axis H of the first quarter-wave plate whereby the minimum value that the DC-voltage indicator indicates decreases to Mx1$m$ (Mx1>Mx1$m$);

finally rotating the polarizer +45 degrees such that the principal axis S thereof and the principal axis S2 of the analyzer forms an angle whereby the value that the DC-voltage indicator indicates increases to x1$m$ (x1$m$>Mx1$m$) which is a reference electric signal;

supplying the reference electric signal to the DC-voltage indicator and an amplifier, wherein the amplifier amplifies the reference electric signal and supplies the amplified signal to a signal processor, and the signal processor generates reference signal data;

then, disposing a test sample between the first quarter-wave plate and the second quarter-wave plate, passing the modulation polarized wave there through, at this time the photodetector generates a transmission electric signal and supplies the transmission electric signal to the DC-voltage indicator and the amplifier, wherein the amplifier amplifies the transmission electric signal and supplies the amplified signal to the signal processor, and the signal processor generates transmission signal data; and then, comparing the reference signal data with the transmission signal data and determining the stress of the test sample.

2. A device for measuring stress using laser photoelasticity, comprising:

a laser light source which produces infrared laser light;

a polarizer, disposed on a light path of the laser light, upon which the laser light is incident and which outputs a linearly polarized wave that oscillates in a fixed direction;

a photoelastic modulator upon which the linearly polarized wave is incident and which outputs a modulation polarized wave that continuously changes from linearly polarized light to circularly polarized light at a predetermined frequency;

a first quarter-wave plate and a second quarter-wave plate upon which the modulation polarized wave are incident in this order;

an analyzer upon which the modulation polarized wave is then incident and which outputs a linear modulation polarized wave which oscillate in another direction;

a photodetector upon which the linear modulation polarized wave is incident and which outputs an electric signal corresponding to a physical property thereof; and a signal processor which compares an electric signal generated at the photodetector when a test sample is not disposed between the first quarter-wave plate and the second quarter-wave plate with a transmission electric signal when a test sample is disposed between the first quarter-wave plate and the second quarter-wave plate and the modulation polarized wave is passed there through, and determines the stress of the test sample, wherein the device for measuring stress further comprises a DC voltage indicator which receives the electric signal that the photodetector generates and indicates a detected numeric value in a DC-voltage indicator to cause the indicator to indicate the detected value, and an amplifier which receives and amplifies the reference electric signal that the photodetector generates;

the polarizer is rotated and positioned such that the transmission principal axis thereof is positioned orthogonally to the oscillation direction of the laser light whereby the minimum value that the DC voltage indicator indicates becomes M, and then the polarizer is rotated +45 degrees such that the value that the DC-voltage indicator indicates becomes a predetermined increased value M0 (M0>M);

the analyzer is rotated such that the principal axis thereof is positioned orthogonally to the principal axis of the polarizer whereby the linear modulation polarized wave arriving at the photodetector decreases and the minimum value that the DC-voltage indicator indicates becomes Mm1;

then, the polarizer is rotated such that the principal axis S thereof is positioned orthogonally to the principal axis of the analyzer whereby the minimum value that the DC-voltage indicator indicates further decreases to Mm2; these operations are repeated whereby the angular position of the polarizer and the analyzer is set such that the value that the DC-voltage indicator indicates gradually decreases to Mmn (Mm1>Mm2> . . . >Mmn);

the photoelastic modulator is rotated such that the principal axis W thereof matches the principal axis S of the polarizer whereby the angular position is set such that the minimum value that the DC-voltage indicator indicates becomes Mx;

the first quarter-wave plate is rotated such that the principal axis H thereof matches the principal axis S of the polarizer whereby the angular position is set such that the minimum value that the DC-voltage indicator indicates decreases to Mxm;

the first quarter-wave plate is rotated +45 degrees whereby the angular position is set such that the value that the DC-voltage indicator indicates becomes a predetermined increased value Mx1 (Mx1>Mxm) and the first quarter-wave plate has a property to convert the modulation polarized light from the photoelastic modulator to swirling linearly-polarized light;

in order that swirling of the linearly polarized light imparted by the first quarter-wave plate is countered when the second quarter-wave plate receives the linearly polarized light, the second quarter-wave plate is rotated whereby the angular position is set such that the principal axis thereof is positioned orthogonally to the principal axis direction of the first quarter-wave plate and the minimum value that the DC voltage indicator indicates decreases to Mx1m (Mx1>Mx1m);

the polarizer is further rotated +45 degrees such that the principal axis thereof and the principal axis of the analyzer forms an angle, and the value that the DC-voltage indicator indicates is set as a reference electric signal of an increased value x1m (x1m>Mx1m);

the signal processor receives the reference electric signal amplified by the amplifier and generates reference signal data; and then, a test sample is disposed between the first quarter-wave plate and the second quarter-wave plate, the modulation polarized wave is passed there through, at this time, the photodetector generates a transmission electric signal and supplies the transmission electric signal to the amplifier, the amplifier amplifies the transmission electric signal and supplies the amplified signal to the signal processor, and the signal processor generates transmission signal data, and the signal processor compares the reference signal data with the transmission signal data and determines the stress of the test sample.

3. The stress measurement device according to claim 2, wherein the photodetector further comprising a thermostatic element having a cooling part and a heat radiation part which operate when power is applied thereto, wherein the photodetector is integrally placed adjacent to the cooling part.

4. A method of measuring stress using laser photoelasticity, wherein an infrared laser beam from a laser source is impinged upon a polarizer positioned on an optical path, the polarizer converts the laser beam into a linearly-polarized light wave that oscillates in a fixed direction and outputs the linearly-polarized light wave, the linearly-polarized light wave is impinged upon a photoelastic modulator, the photoelastic modulator converts the linearly polarized light wave into a modulation polarized wave that changes continuously from linearly polarized light to circularly polarized light with a predetermined frequency; the modulation polarized wave is impinged upon and passed through a first quarter-wave plate and a second quarter-wave plate, the modulation polarized wave is impinged upon an analyzer and the analyzer converts the modulation polarized wave into a linear modulation polarized wave that oscillates in another direction, the linear modulation polarized wave is impinged upon a photodetector and the photodetector generates an electric signal corresponding to the physical property of the linear modulation polarized wave;

then, a test sample is disposed between the first quarter-wave plate and the second quarter-wave plate, the modulated polarized wave is passed there through, and the electric signal generated at the photodetector when the test sample is not disposed between the first quarter-wave plate and the second quarter-wave plate is compared with the transmission electric signal when the test sample is disposed between the first quarter-wave plate and the second quarter-wave plate and the stress of the test sample is determined;

wherein the electric signal is input to a DC-voltage indicator to indicate the detected value;

the polarizer is rotated and positioned such that the transmission principal axis thereof is positioned orthogonally to the oscillation direction of the laser light whereby the minimum value detected becomes M, and then the polarizer is rotated +45 degrees such that the detected value becomes a predetermined increased value M0 (M0>M);

the analyzer is rotated such that the principal axis thereof is positioned orthogonally to the principal axis of the polarizer whereby the linear modulation polarized wave arriving at the photodetector decreases and the minimum value detected becomes Mm1;

then, the polarizer is rotated such that the principal axis S thereof is positioned orthogonally to the principal axis of the analyzer whereby the minimum value detected further decreases to Mm2;

these operations are repeated whereby the angular position of the polarizer and the analyzer is set such that the detected value gradually decreases to Mmn (Mm1>Mm2> . . . >Mmn);

the photoelastic modulator is rotated such that the principal axis W thereof matches the principal axis S of the polarizer whereby the angular position is set such that the minimum value detected becomes Mx;

the first quarter-wave plate is rotated such that the principal axis H thereof matches the principal axis S of the polarizer whereby the angular position is set such that the minimum value detected decreases to Mxm;

the first quarter-wave plate is rotated +45 degrees whereby the angular position is set such that the detected value becomes a predetermined increased value Mx1 (Mx1>Mxm) and the first quarter-wave plate has a property to convert the modulation polarized light from the photoelastic modulator to swirling linearly-polarized light;

in order that swirling of the linearly polarized light imparted by the first quarter-wave plate is countered when the second quarter-wave plate receives the linearly polarized light, the second quarter-wave plate is rotated whereby the angular position is set such that the principal axis thereof is positioned orthogonally to the principal axis direction of the first quarter-wave plate and the minimum value detected decreases to Mx1$m$ (Mx1>Mx1$m$);

the polarizer is further rotated +45 degrees such that the principal axis thereof and the principal axis of the analyzer forms an angle, and the detected value is set as a reference electric signal of an increased value x1$m$ (x1$m$>Mx1$m$);

the reference electric signal generated at the photodetector is supplied to an amplifier, the amplifier amplifies the reference electric signal and supplies the amplified signal to a signal processor, and the signal processor generates a reference signal data; then, a test sample is disposed between the first quarter-wave plate and the second quarter-wave plate, the modulated polarized wave is passed there through, at this time, the photodetector generates a transmission electric signal and supplies the transmission electric signal to the amplifier, the amplifier amplifies the transmission electric signal and supplies the amplified signal to the signal processor, and the signal processor generates transmission signal data, and the signal processor compares the reference signal data with the transmission signal data and determines stress of the test sample; and a phase plate having a known phase difference is disposed as another test sample between the first quarter-wave plate and the second quarter-wave plate, transmission signal data is obtained at least twice while rotating the phase plate, the transmission signal data and the known phase difference thereof are input to the signal processor to determine the correlation there between, based on which a phase difference of a test sample having an unknown phase difference is determined, and the phase difference thereof is converted to stress by the use of the photoelastic constant.

* * * * *

UNITED STATES PATENT AND TRADEMARK OFFICE
CERTIFICATE OF CORRECTION

PATENT NO. : 7,639,348 B2  Page 1 of 1
APPLICATION NO. : 10/586148
DATED : December 29, 2009
INVENTOR(S) : Niitsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 535 days.

Signed and Sealed this

Ninth Day of November, 2010

David J. Kappos
*Director of the United States Patent and Trademark Office*